(12) United States Patent
Altevogt et al.

(10) Patent No.: US 7,840,825 B2
(45) Date of Patent: Nov. 23, 2010

(54) METHOD FOR AUTONOMOUS DYNAMIC VOLTAGE AND FREQUENCY SCALING OF MICROPROCESSORS

(75) Inventors: Peter Altevogt, Ettlingen (DE); Hans Boettiger, Tuebingen (DE); Wesley M. Felter, Austin, TX (US); Charles R. Lefurgy, Austin, TX (US); Lutz Stiege, Lueneburg (DE); Malcolm S. Ware, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 744 days.

(21) Appl. No.: 11/838,331

(22) Filed: Aug. 14, 2007

(65) Prior Publication Data

US 2008/0098254 A1 Apr. 24, 2008

(30) Foreign Application Priority Data

Oct. 24, 2006 (EP) .................................. 06122822

(51) Int. Cl.
*G06F 1/32* (2006.01)
(52) U.S. Cl. ........................ 713/320; 713/600; 718/102; 714/1
(58) Field of Classification Search ................. 713/320, 713/600; 718/102; 714/1
See application file for complete search history.

(56) References Cited

U.S. PATENT DOCUMENTS 7,155,617 B2 * 12/2006 Gary et al. ................... 713/300
7,430,676 B2 * 9/2008 Baker et al. ................. 713/322
2004/0117680 A1 * 6/2004 Naffziger ..................... 713/322
2005/0076253 A1 * 4/2005 Lu ............................... 713/320

OTHER PUBLICATIONS

China Patent Office—Office Action dated Sep. 25, 2009 in Chinese.
Yu, Jing—Response to Office Action dated Sep. 25, 2009 in Chinese.
R. McGowen, Power and Temperature Control on a 90-nm Itanium Family Processor, IEEE Jour. Of Solid State Signals vol. 1, Jan. 2006, pp. 229-237.
T. Fischer et al., A 90-nm Variable Frequency Clock System for a Power Managed Itanium Architecture Processor, IEEE Jour. Of Solid State Signals vol. 1, Jan. 2006, pp. 218-228.
C. Isci et al, Long Term Workload Phases: Duration Predictions and Applications to DVFS, IEEE Micro vol. 25, 2005, pp. 39-51.

(Continued)

*Primary Examiner*—Thuan N Du
(74) *Attorney, Agent, or Firm*—Dillon & Yudell LLP

(57) ABSTRACT

A method for autonomous dynamic voltage (v) and frequency (f) scaling (DVFS) of a microprocessor, wherein autonomous detection of phases of high microprocessor workload and prediction of their duration is performed (PID). The microprocessor frequency (f) will be temporarily increased (LUT) to an appropriate safe value (even beyond its nominal frequency) consistent with technological and ambient constraints in order to improve performance when the computer system comprising the microprocessor benefits most, while during phases of low microprocessor workload its frequency (f) and voltage (v) will be decreased to save energy. This technique exploits hidden performance capabilities and improves the total performance of a computer system without compromising operational stability. No additional hardware such as service processors is needed for contemporary computer systems supporting performance counters and DFVS already. The invention allows significantly increasing the total computer system performance with only minimal impact on power ($P_{MAX}$, $P_{ACTUAL}$) consumption.

13 Claims, 9 Drawing Sheets

OTHER PUBLICATIONS

W.L. Bircher et al, Runtime Identification of Microprocessor Energy Saving Opportunities, ISLPED'05, Aug. 8-10, 2005, San Diego, CA, 6 pages.

X. Wang et al., Managing Peak Sysem-Level Power with Feedback Control, RC23835 (W0512-086) Dec. 19, 2005, pp. 1-12.

* cited by examiner

METHOD FOR AUTONOMOUS DYNAMIC VOLTAGE AND FREQUENCY SCALING OF MICROPROCESSORS

BACKGROUND OF THE INVENTION

The present invention relates to the adaptive dynamic management of computer system operations, and more specifically to the dynamic voltage and frequency scaling (DVFS) of microprocessors.

Generally, microprocessor performance gain is achieved by increasing the microprocessor (clock) frequency. But this goes along with the requirement of a higher effort in production and development costs, finally resulting in higher asset costs for computer systems. Permanent rise of the nominal frequency goes along with high requirements on cooling techniques and materials. Many microprocessor manufacturers dimension the maximal microprocessor frequency rather conservative to ensure operational stability and make some worst-case assumptions, so that for example environmental setups like those provided in air-conditioned rooms for huge server clusters are feasible.

Power consumption and the associated heat generation of modern microprocessors are key design issues in the development process of computer systems, especially when the available space is very limited like in desktop systems or blade centers. Many mechanisms exist in contemporary microprocessors to vary its power consumption, e.g. by explicitly decreasing or increasing frequency and voltage. Many modern microprocessors provide such DVFS mechanisms. Enhanced SpeedStep is one of those and supported by various Intel microprocessors.

An important feature of contemporary microprocessors is the availability of a multitude of performance counters providing detailed information about workload characteristics, e.g. information about retired (completed) Instructions Per clock Cycle (IPC), processor cache misses, etc.

Nominal microprocessor frequencies used in computer systems are based on worst case assumptions concerning certain characteristics; e.g., ambient temperature and power demand of workloads. In general, the microprocessor hardware allows frequencies that are significantly higher than the nominal frequencies. Thermal limitations are frequently alleviated by modern cooling techniques or an air conditioned setting of the system. Microprocessor power consumption depends significantly on the type of workload. However, in typical customer scenarios, the worst case assumptions do not occur simultaneously.

Various approaches to autonomously reduce microprocessor power consumption exist when there has been no or little system utilization detected for some period of time. A metric often used for workload characterization is the IPC number. It allows characterizing the microprocessor performance independent of its clock frequency. A method for prediction of workload phase duration and characterization is proposed in C. Isci et al "Long-Term Workload Phases: Duration Predictions and Applications to DVFS", IEEE Micro, Vol. 25, 5/2005, pp. 39-51. That work mainly concentrates on a workload estimation using a last-value prediction. A gradient-based workload prediction technique based on linear regression is described in W. L. Bircher et al "Runtime Identification of Microprocessor Energy Saving Opportunities", Proc. of the ILSPED 2005, pp. 275-280.

The so-called Foxton technology as used in the Intel Itanium2 is an example for a mechanism used in contemporary microprocessors to increase frequency and voltage above the default values by using a temporary overclocking on the chip level. Descriptions of the Foxton technology are given in R. McGowen et al "Power and temperature control on a 90-nm Itanium family processor" IEEE Journal of Solid State Signals Vol. 1, 1/2006, pp. 229-237 and T. Fischer et al "A 90-nm variable frequency clock system for a power-managed itanium architecture processor", IEEE Journal of Solid State Signals Vol. 1, 1/2006, pp. 218-228.

Existing DVFS solutions mainly focus on the improvement of microprocessor energy efficiency and not boosting of its performance. They optimize microprocessor power consumption with only minimal impact on the performance of the workload currently executed by the microprocessor.

SUMMARY OF THE INVENTION

It is therefore an object of the present invention to provide a method for autonomous DVFS of a microprocessor that is improved over the prior art, and a corresponding computer program and computer program product, and a corresponding computer system.

The advantages of the present invention are achieved by the autonomous detecting of phases of high microprocessor workload and prediction of their duration. The microprocessor frequency will be temporarily increased to an appropriate safe value (even beyond nominal frequency) consistent with technological and ambient constraints in order to improve performance when the computer system comprising the microprocessor benefits most, while during phases of low microprocessor workload its frequency and voltage will be decreased to save energy. This technique exploits hidden performance capabilities and improves the total performance of a computer system without compromising operational stability. No additional hardware such as service processors is needed for contemporary computer systems supporting performance counters and DFVS already.

A method in accordance with the invention basically consists of steps for measurement, prediction and control in conjunction with a computer system comprising at least one microprocessor. More detailed, the method comprises the steps of:

collecting and storing performance data of said computer system during a period of time;

predicting future workload metrics and their duration for said computer system from the stored performance data, and classifying the current workload for said computer system at least in phases of normal and high workload based on the predicted future workload metrics and their predicted duration;

modifying parameters of said computer system suitable to increase the frequency and voltage of said microprocessor for current workloads classified as a phase of high workload;

modifying frequency and voltage of said microprocessor to their normal values for current workloads classified as a phase of normal workload In the preferred embodiment of the invention the following steps are iterated at a specified sampling interval, recording data to obtain previously calculated values:

calculating the power consumption P of the computer system comprising the microprocessor during the most recent sampling interval (t_n−1, t_n), dividing the difference of the total aggregated energy values at time t_n and t_n−1 by the sampling interval duration;

measuring the microprocessor temperature;

calculating the current IPC of the microprocessor by using its performance counters;

predicting microprocessor workload phase characteristics based on the current IPC;

checking whether a prediction for the current IPC exists;

if a prediction exists, keeping the predicted value and previous workload classifications, otherwise checking whether a prediction should be performed by applying an appropriate stability criteria;

if no new prediction should be performed, invalidating all predicted values, classifying the workload as normal, otherwise checking whether a prediction for the previous sampling time from a previous prediction exists;

if a prediction for the previous sampling time exists, checking whether the prediction for the previous sampling time deviates less than a specified value from the current IPC and if not, invalidating all predicted values and classifying the current workload as normal;

if no prediction for the previous sampling time exists, determining whether enough previously measured samples have been collected for a prediction, and if not, keeping the predicted values and previous workload classification, otherwise performing a prediction for the duration of the current workload phase, predicting the IPC for the current workload phase, and classifying the predicted workload in idle, normal, and high workloads;

if the predicted workload is idle, setting the microprocessor frequency and voltage to the minimum allowed values;

if the predicted workload is normal, setting the microprocessor frequency and voltage to their nominal values;

if the predicted workload is high, activating a control feedback loop circuit to set the microprocessor frequency and voltage autonomously according to power or temperature setpoints in order to prevent hardware damages or malfunctions.

The invention allows significantly increasing the total computer system performance with only minimal impact on power consumption.

BRIEF DESCRIPTION OF THE DRAWINGS

The present invention and its advantages are now described in conjunction with the accompanying drawings.

DETAILED DESCRIPTION

TurboMode

Figure 1:
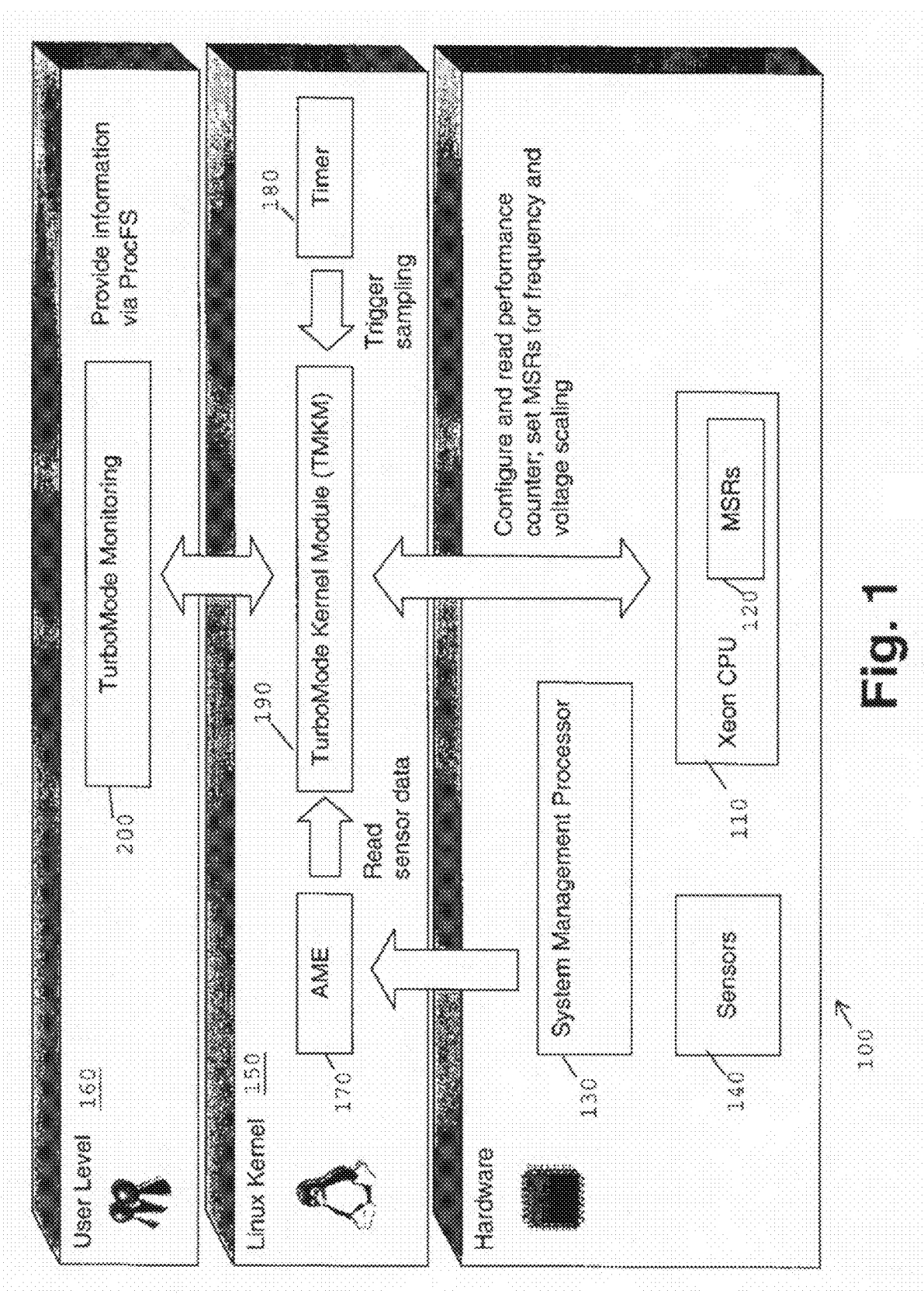
FIG. 1: Is block diagram illustrating the system architecture of an embodiment of the invention.

FIG. 1 illustrates the system architecture of an embodiment of the invention in a computer system 100. The embodiment is called TurboMode. A Xeon microprocessor is used as CPU (Central Processing Unit) 110 in the computer system 100. The Xeon microprocessor can control its operation by using a set of MSRs (Model Specific Registers) 120. A system management processor 130 controls the operation of the computer system 100. It uses a set of hardware sensors 140 to monitor the hardware elements of the computer system 100 including the CPU 110. The computer system 100 executes an instance of the Linux operating system with a Linux kernel 150 instance and various processes running in the user-level 160 of the Linux operating system.

The Linux kernel 150 comprises various kernel modules that can especially create kernel threads that are running concurrently. The invention uses the AME (Autonomic Management of Energy) 170 kernel module and the timer facility 180 of the Linux kernel 150. The timer 150 facility allows using Linux kernel timers—data structures that instruct the Linux kernel 150 to execute a user-defined function with a user-defined argument at a user-defined time. This function runs then asynchronously to the process that registered the timer. Typical resolutions for the Linux system timer 180 facility allow a maximal sampling frequency of 1 kHz for measurements.

A TurboMode kernel module 190 implements a method in accordance with the present invention. An optional TurboMode monitoring process 200 in the user level 160 allows to present information about the current operational state of TurboMode to users of the computer system 100. The TurboMode monitoring process 200 provides also a tracing facility to keep a logbook about the Turbomode operational state. The interface to the tracing facility is realized via entries in the Linux proc filesystem. The AME 170 kernel module provides interfaces for sensor data measurements, which are used by the TurboMode kernel module 190 to read sensor data from the sensors 140. The timer facility 180 periodically calls the TurboMode kernel module 190 to sample sensor data for the sensor 140, for which it uses a separate kernel thread.

A potential implementation for the computer system 100 is described in the IBM Research Report RC23835 (W0512-086), Dec. 19, 2005: X. Wang et al "Managing Peak System-level Power with Feedback Control". An IBM BladeCenter comprises multiple HS20 blades with Intel Xeon processors. The power management is shown there in FIG. 1 BladeCenter Chassis. Two different Xeon microprocessors were used: The Intel Xeon Nocona and the Intel Xeon Irwindale. Both microprocessors have a nominal frequency of 3.6 GHz.

The system management processor 130 is implemented by the Hitachi H8S 2166 service processor. The AME 170 accesses the sensors 140 via I/O (input/output) ports from the system management processor 130, which are made accessible for reading by the TurboMode kernel module 190. This allows a fast access to sensor data, which is required for high sampling frequencies and results in better operating stability and higher granularity for dynamic changes. A sampling interval of 10 ms for the sensor data turned out to be sufficient for this environment for the sampling kernel thread of the TurboMode kernel module 190.

Workload Prediction

Figure 2:
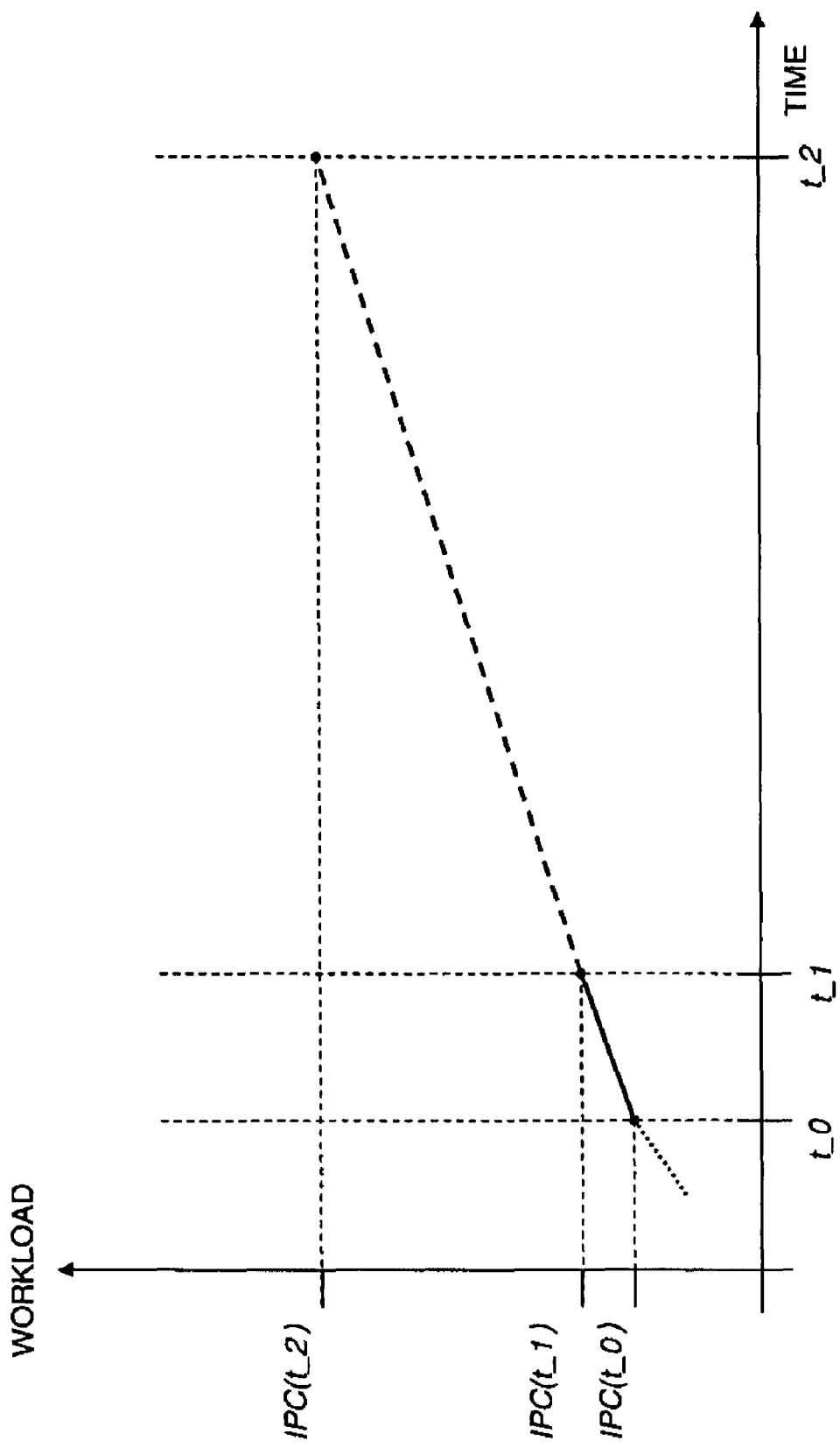
FIG. 2: Is a graph of a function illustrating gradient-based workload duration prediction according to the invention.
Figure 3:
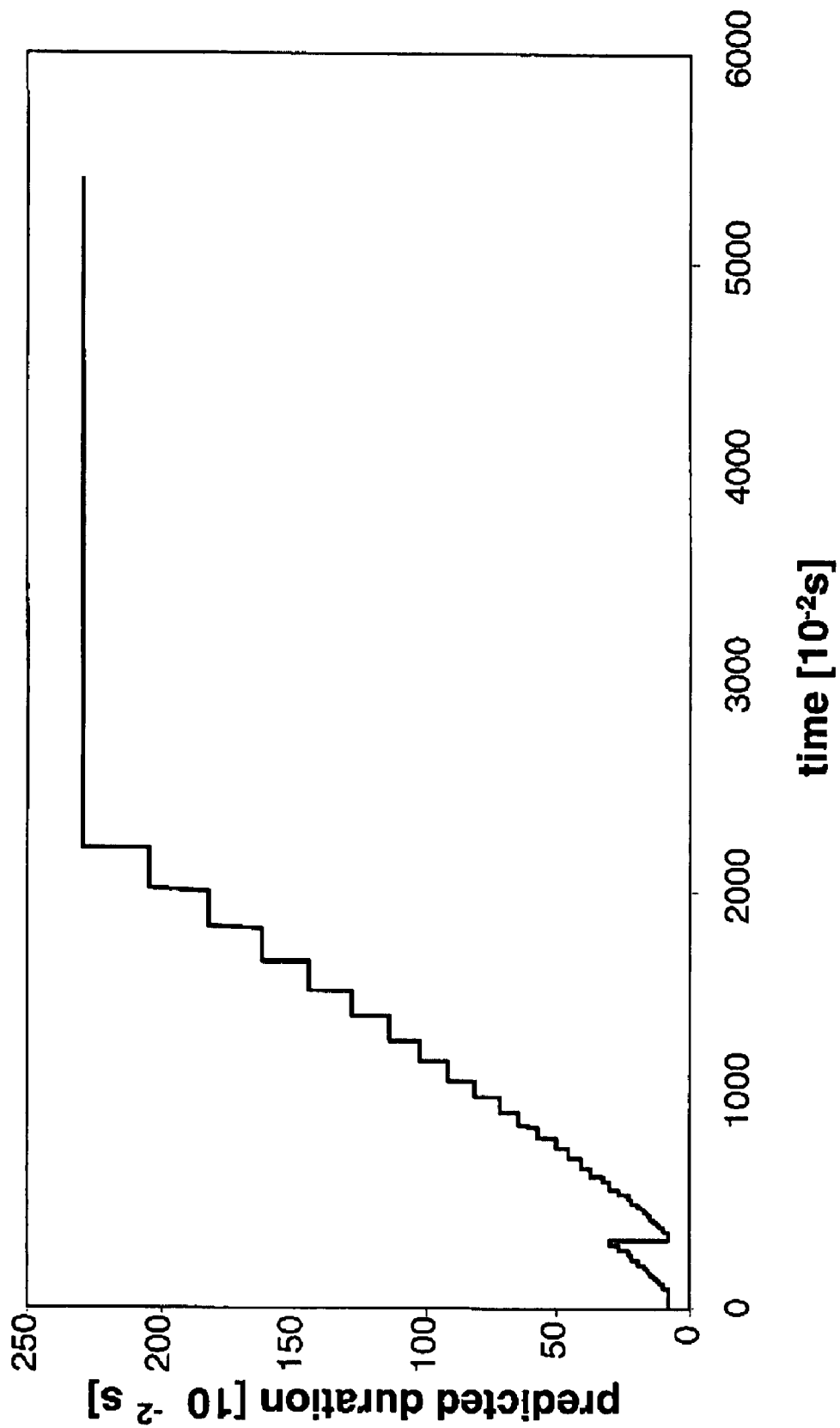
FIG. 3: Is a graph of a workload phase duration prediction over time.

FIG. 2 illustrates the gradient-based prediction of IPC values as used for the workload phase duration prediction according to the present invention. Previously measured IPC values ($IPC(t\_0)$, $IPC(t\_1)$) are used to calculate the gradient for the previous duration interval ($t\_1-t\_0$). This gradient is applied to predict the IPC values for the next duration interval ($t2-t1$). A prediction for a future $IPC(t\_2)$ is then calculated as follows:

$$IPC(t\_2) = IPC(t\_1) + \frac{IPC(t\_1) - IPC(t\_0)}{t\_0 - t\_0} \cdot (t\_2 - t\_1)$$

The basic rationale for predicting the duration is that if a specific number of consecutive measured IPC values lies within a specified window, the IPC can be declared as stable, which means that it follows a constant progression. So if this number of stable samples is seen, the assumption can be made that a particular amount of further samples lying in the stability window will be seen. With an increasing number of consecutive stable samples, the predicted number of following samples also rises.

A number of consecutive stable samples ($X_0$) are required to perform a first prediction, where stability is defined by the criterion that each sample has to lie within a predefined threshold to each other. It is assumed that if $X_n$ samples are seen ($X_0$ on first iteration), $X_{n+1}$ further samples within the stability criterion will follow. This process is iterated until the maximal allowed prediction duration is reached or a single sample falls out of the stability criterion. In the first case, the predicted duration is kept at its previous value ($X_{n+1}=X_n$) in the second one it is reset to $X_0$. This algorithm can be described as follows:

$$X_{n+1} = X_n + \frac{X_n}{S}; X_0 = S$$

Measurements based on Standard Performance Evaluation Corporation (SPEC) CPU 2000 benchmark results have shown that good results can be achieved with S:=8. In this case the algorithm starts with an initial number of 8 subsequent stable samples, which are required to do a first prediction. Then, a prediction is made that nine further stable samples will be seen. If during these nine samples no sample fails out of the stability window, the next prediction will be performed, estimating that another ten samples will match the stability criterion This process will be iterated until a single sample will fall out the window and deviates more than specified by the limit from the measured IPC. An example phase duration prediction graph using this algorithm is shown in FIG. 2.

Measurements for a TurboMode implementation in an IBM BlaceCenter computer system similar to the one described earlier have shown that samples fall out of the window occasionally due to IPC measurement failures caused by timing problems or noises on the IPC induced by running background processes in the user-level 160 and kernel threads in the Linux kernel 150 of the Linux operating system. Timing problems even led to short but huge outliers that corrupt gradient calculation. Because the Linux kernel running on the IBM HS20 blades in the IBM BladeCenter had no hard real-time support, this problem may not be eliminated. Therefore, the median value of the current IPCs is calculated as well as their average. The median is the 50-percentile of a data series. It can be determined by sorting the series by value and picking the one from the middle. The advantage of the median value lies in its capability to filter even huge outliers.

To get the median value of the actual workload, the values for following IPCs would be required. This is impossible and estimated results would even lead to a bigger process error. So on calculation the median of the IPC M/2 samples ago is received as illustrated in the following equation for M=3:

$$MED(ipc(t\_(now - M/2))) = MED\{ipc(t\_(now - M)); ipc(t\_(now - M/2)); ipc(t\_now)\}$$

A similar problem occurs at the average calculation, but this can be directly influenced as the new measured value is not filtered. This leads then to the problem that also outliers are not filtered in such a good way like they are with the median. M/2 sample intervals (t_Y–t_X) are needed for the median to recognize that a jump of the measured IPC occurred, whereas the average instantly reacts but suffers on the slow replacement of the old values in its buffer. This leads to an immoderate smoothing of the measurements and can cause overshoots in gradient calculation. Therefore, the number of samples used for gradient calculation should be greater than the amount of samples taken in the period of median phase shift (t_y–t_x). In order to get a compromise, both values will be used for the improvement of the measured IPC. The median values are used for gradient calculation, while the average values are utilized to calculate the deviation between the predicted and the measured IPC.

Power and Temperature Control

The TurboMode kernel module 190 implements a DVFS method in accordance with the present invention. Frequency and voltage of a microprocessor cannot be set independently and only to discrete values. A P-State (performance state) model defines available frequencies and voltages for a microprocessor in a lookup table to have discrete values for a fixed amount of states. In order to modify current operating frequency and voltage of the microprocessor, it can be transferred to a different P-State. For microprocessors supporting DVFS a bigger granularity of P-State definitions can be used in order to improve power control quality.

Microprocessor power consumption has to be controlled during high IPC phases to guarantee operational safety of the computer system and not to damage hardware. During phases of low or normal microprocessor workloads, power consumption should be as small as possible. Therefore, microprocessor frequency and voltage are set to their defaults values during phases of normal IPC, and even scaled down for phases of low IPC in order to save energy. Only during phases when the TurboMode kernel module 190 triggers a frequency boost, a power control loop must ensure that the power consumption stays within its limits.

Figure 4:
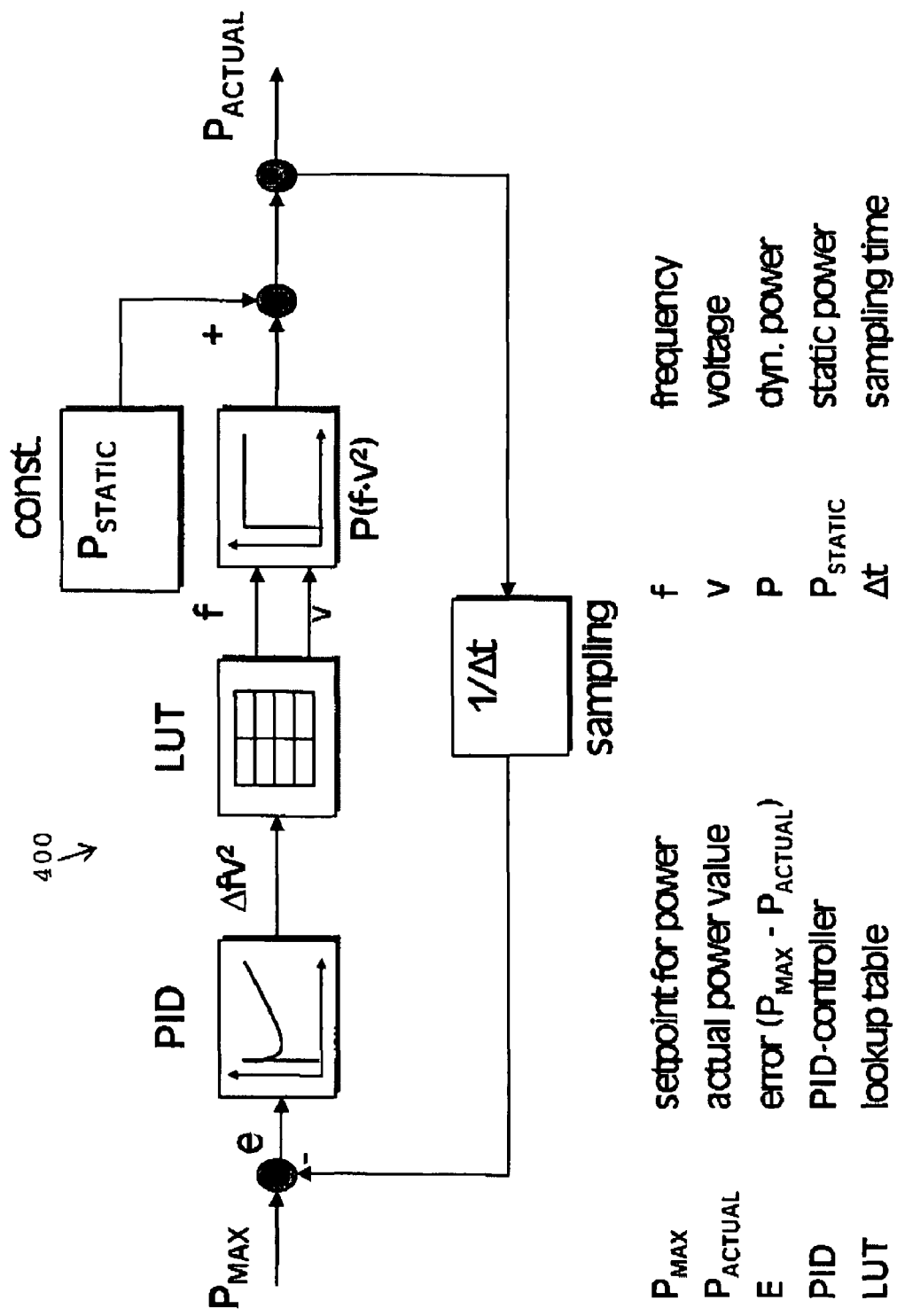
FIG. 4: Is a block diagram of a microprocessor power control loop according to the invention.

According to the invention, either temperature or power will be controlled by a control feedback loop. FIG. 4 illustrates schematically the functionality for such a power control loop 400. As the setpoint for the control the maximal permanent power value $P_{MAX}$ is used. The error e for the difference between $P_{MAX}$ and $P_{ACTUAL}$ is used as the input for a PID controller to calculate the output depending on the specified parameters of the PID controller. The result is a value $\Delta fv^2$ that describes how much the product of the frequency and the squared voltage should be changed from its current value. With a lookup table LUT this value is transformed into a discrete frequency f and voltage v pair as the new settings for the microprocessor. The valve of the control loop 400 is the lookup table LUT that maps the output of the PID controller to discrete absolute frequency f and voltage v values that are fed into the microprocessor and will result into a new actual power $P_{ACTUAL}$ consisting of a dynamic part P and a constant static part $P_{STATIC}$. This new power value $P_{ACTUAL}$ will be measured at the start of the next sampling interval defined by a value $\Delta t$.

Figure 5:
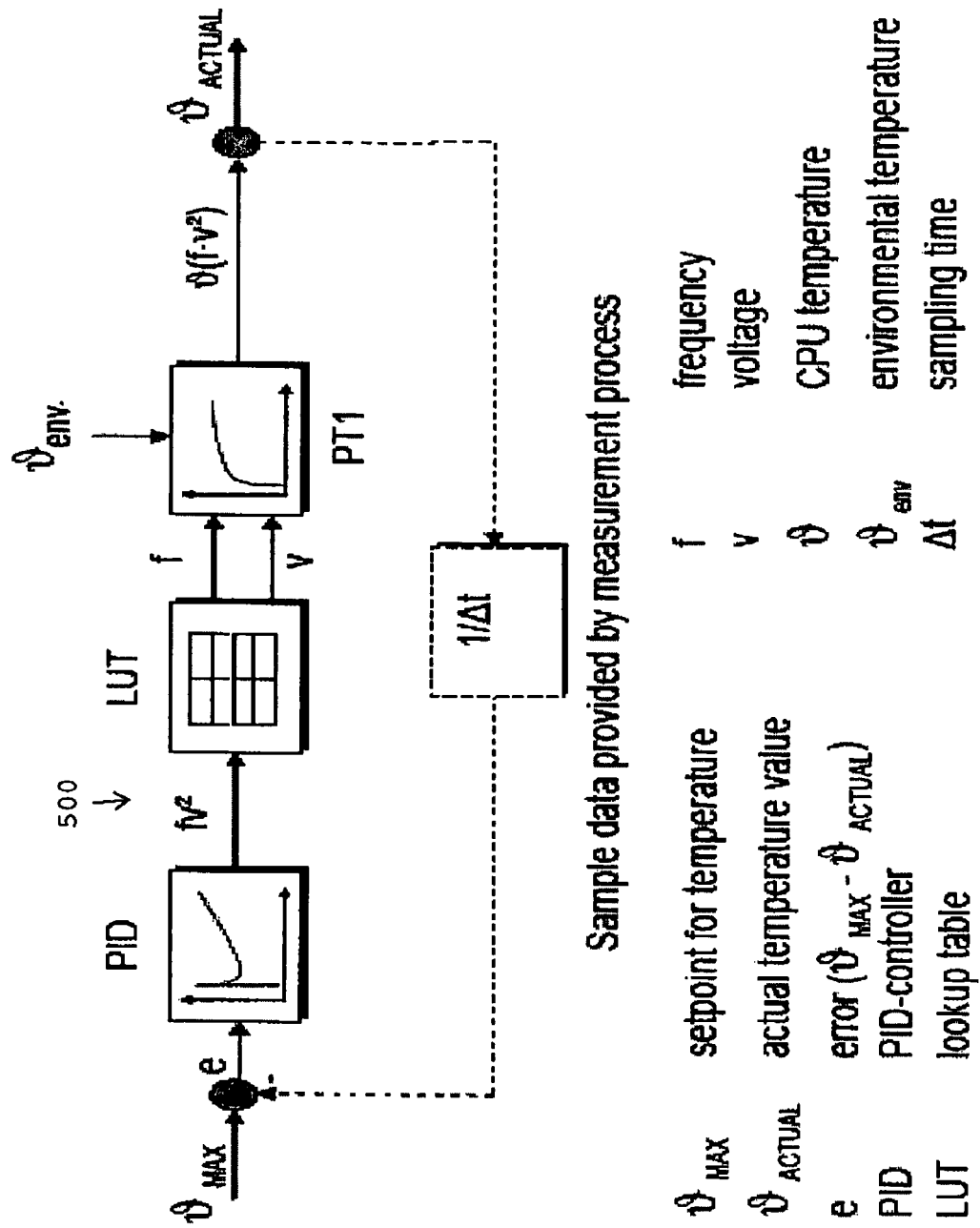
FIG. 5: Is a block diagram of a microprocessor temperature control loop according to the invention.

FIG. 5 illustrates schematically the functionality of a temperature control loop 500 in accordance with the invention. The control loop 500 uses the PFi), the LUT and the sampling interval of the power control loop 400. As the setpoint for the control the maximal permanent temperature value $V_{MAX}$ is used. The error e for the difference between $V_{MAX}$ and $V_{ACTUAL}$ is used as the input for the PID controller to calculate the output depending on the specified parameters of the PID controller The result is a value $fv^2$ that describes the product of the frequency and the squared voltage. With the lookup table LUT this value is transformed into a discrete frequency f and voltage v pair. The valve of the control loop 500 is the lookup table LUT that maps the output of the PID controller to discrete absolute frequency f and voltage v values that are fed into the microprocessor and will result into a new actual temperature $V_{ACTUAL}$ depending on the current environmental temperature $V_{RNV}$. This new temperature value $V_{ACTUAL}$ will be measured at the start of the next sampling interval defined by the value $\Delta t$.

In the preferred embodiment of the present invention, the PID controller is implemented by the TurboMode kernel module 190 with the help of the AME 170 kernel module and the MSRs 120 of the Xeon microprocessor. The PID controller separates current status of the computer system 100 basically between three different states for the CPU 110: idle, normal, and high IPC phases. An indication for an idle phase is determined by the calculation of an activity factor of the CPU 110 describing its utilization. The activity factor is the number of clock cycles where the CPU 110 is not halted divided by the number of all clock cycles during a sampling interval. If the activity factor drops below a specific threshold, the CPU 110 will be set by the TurboMode kernel module 190 to the P-State used for the idle phase. In this case, the microprocessor frequency and voltage of the CPU 110 are set to the lowest possible P-State in order to save energy. For the detection and treatment of idle phases also well-known methods to reduce microprocessor power consumption can be used.

During normal IPC phases, microprocessor frequency and voltage are set to their default P-State in order to allow standard operational behavior of the CPU 110. Microprocessor power and temperature control is not active during idle or normal IPC phases as power and temperature limits for the microprocessor cannot be reached. During phases with high IPC, the TurboMode kernel module 190 sets microprocessor frequency and voltage of the CPU 110 to a P-State that allows a performance boost for the CPU 110. For this P-State the power and control loop needs to ensure that power and temperature limits are not exceeded in order to prevent hardware damages and malfunctions.

The invention can be extended to multiple CPUs in the computer system 100. In that case, a separate power and temperature control loop can be used for every CPU or the same power and temperature control loop can be used for all CPUs.

Measurement and Prediction

A Linux kernel timer is configured to execute a specific function of the TurboMode kernel module 190. This function triggers a sleeping sampling kernel thread to perform measurement and prediction and configuring the Linux kernel timer for the next triggering after same interval of time (sampling interval). This way a periodic rescheduling process of the sampling kernel thread is achieved. This rescheduling process is continued until a specified number of samples have been collected. Then a tracing thread created by the TurboMode kernel module 190 is triggered to write the collected measurement and prediction data into a trace tile.

Figure 6:
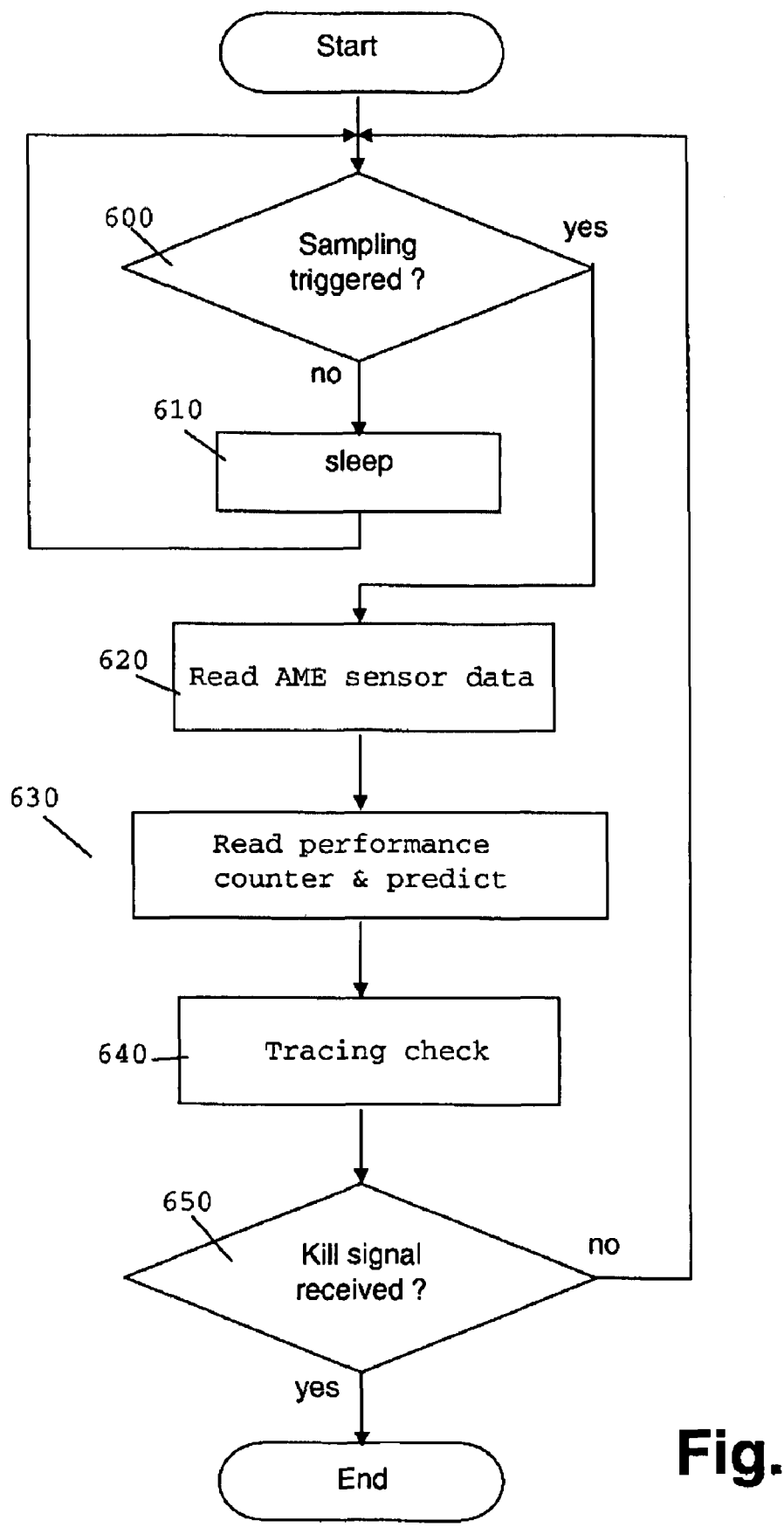
FIG. 6: Is a block diagram of a flow chart for a method in accordance with the invention.

FIG. 6 shows the general control flow for the sampling kernel thread. In step 600 it is determined if the sampling thread was triggered by the Linux kernel timer. If not, the sampling kernel thread is sleeping in step 610 until it will be triggered by the Linux kernel timer. If the sampling kernel thread was triggered (step 600), sensor data is read from the AME 170 kernel module in step 620. The collected sensor data is then used in step 630 together with the content of the MSRs 120 to predict the IPC. In step 640 it will be determined if the tracing thread needs to be triggered in case tracing is enabled. In step 650 it will be checked if the sampling kernel thread needs to be cancelled in case the Linux kernel 150 has sent a kill signal to the sampling kernel thread If no kill signal was received, then the Linux kernel timer will be set up to trigger execution of the sampling thread after the sampling time has elapsed.

Figure 7:
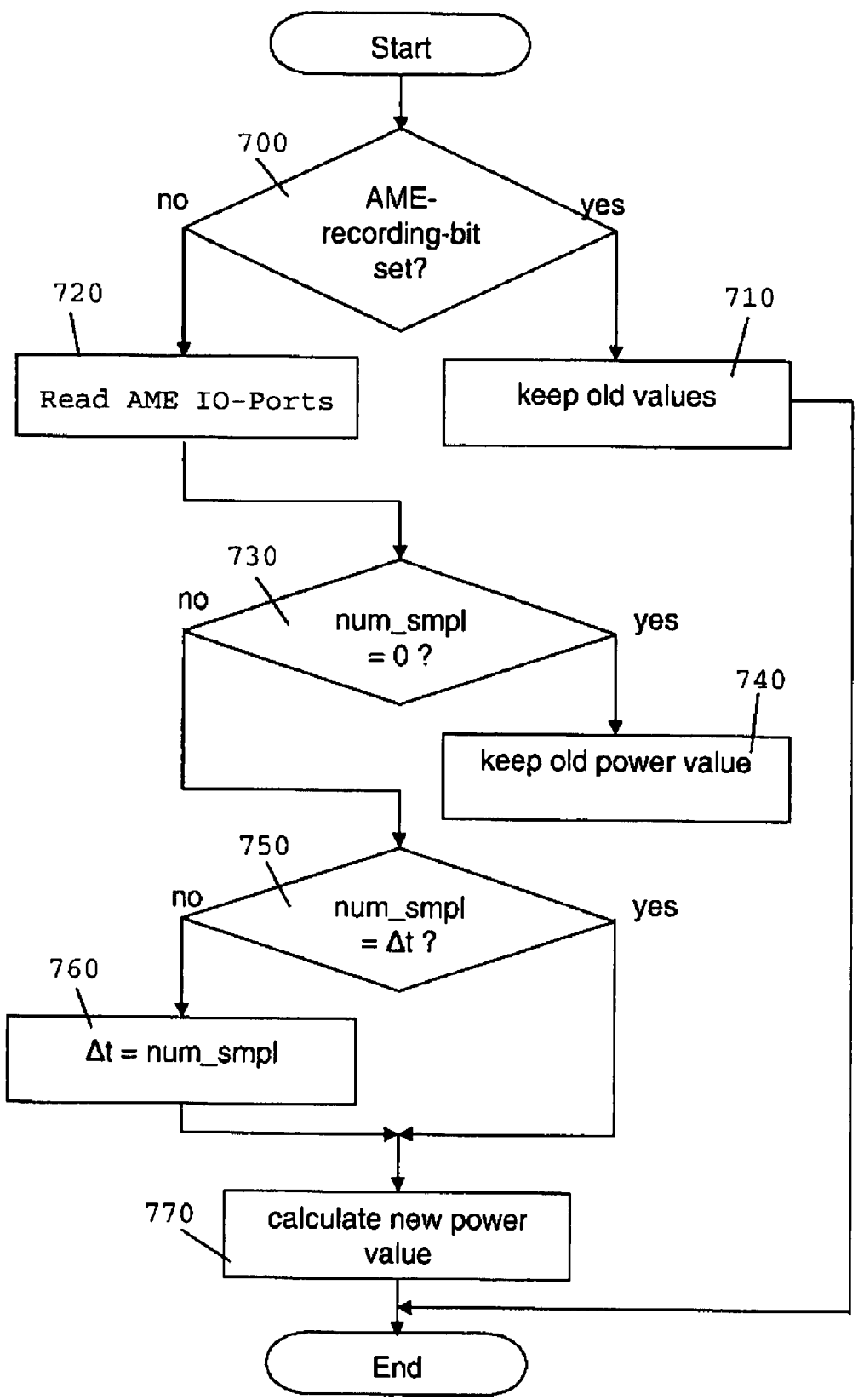
FIG. 7: Is a block diagram of a flow chart for a method in accordance with the invention.

Reading sensor data via the AME 170 kernel module is a measurement for the entire computer system 100 and therefore does not depend on the number of CPUs (in case there are more CPUs than the single CPU 110). In the very first sampling of sensor data no prediction will be performed. FIG. 7 provides a more detailed control flow for the collection of the sensor data for the following iterations. In step 700 it will be tested, if the AME recording bit provided by the AME 170 kernel module is set. If so, no new sensor data is provided by the AME 170 kernel module and the old values will be kept in step 710. Otherwise the I/O ports provided by the AME 170 kernel module are read in step 720. In step 730 it is determined if power and temperature relevant sensor data has not changed. If so, then the old values will be kept in step 740. Otherwise it will be checked in step 750 if the number of new sensor data is equal to the time difference between the current and the last sampling. If not, then in step 760 the sensor data from the previous sampling time will be used instead of the sensor data from the current sampling time. Finally, in step 770 the new power and temperature values will be calculated.

For example, the power related sensor data can be the energy consumption of the CPU 110. Then the new power value is calculated by dividing the difference of the energy consumption by the time interval. In order to improve performance, the measurement can be performed separately and concurrently on each CPU.

Figure 8:
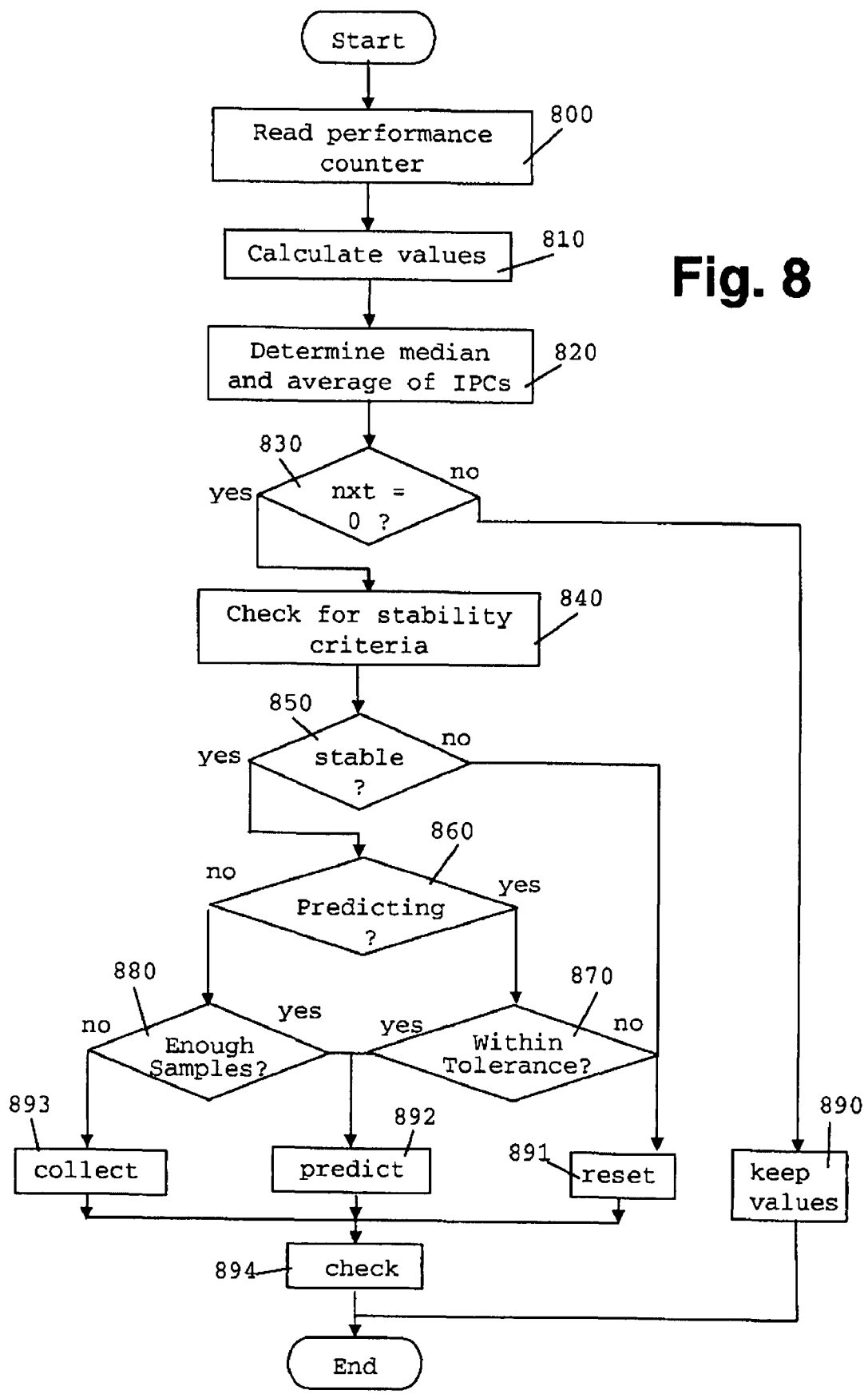
FIG. 8: Is a block diagram of a flow chart for a method in accordance with the invention.

The control flow for the Xeon microprocessor performance counter measurement and the IPC prediction is shown in FIG. 8. As with the reading of the sensor data, the very first step is omitted as only the performance counter values can be collected. On the subsequent iterations the calculation of basic metrics like IPC, frequency and processor cache misses per cycle (CMPC) is performed after the collection of the performance counter values. In step 800 the performance counter values are collected from the MSRs 120. The metrics are calculated in step 810. The median value and the average of the IPC are calculated in step 820.

In step 830 it will be checked if the number of samples to he collected until the next prediction has to be performed is equal 0. If so, then the old prediction values will be kept in step 890. Otherwise stability criteria for the CPU 110 will be tested in step 840. These stability criteria are defined as follows: The current median value of the IPC must not deviate from the previous value by more than a predefined value, and the current IPC value must not deviate from the previous value by more than a predefined value.

In step 850 it will be checked if stability criteria for the IPC are fulfilled. If not, then the predicted values are reset in step 891. Otherwise it will be checked in step 860 if a prediction of the IPC was performed earlier. If so, then this prediction will be tested in step 870 for a maximal tolerance interval. This tolerance interval is given by the absolute difference to the current average of the IPC. If the previous prediction is not within the maximal tolerance interval, then it will be reset in step 891. Otherwise it will be used for the prediction in step 892. If no previous prediction of the IPC was detected in step 860, then it will be checked in step 880 if enough samples are available for a prediction. If so, then they will be used for the prediction in step 892. Otherwise further samples will be collected in step 893.

After prediction is done (subsequent to the steps 891, 892, 893) it will be determined in step 894 if the computer system 100 would benefit from a performance boost for the CPU 110. This is performed by checking whether the current predicted IPC and its duration exceeds a specified threshold. If so, a frequency boost for the CPU 110 will be initiated. On a currently running frequency boost, it will be tested, if the IPC has dropped down below a lower threshold for an amount of specified samples to stop the frequency boost. If a frequency boost can be applied, a flag will be set to indicate this to the control loop.

Another embodiment for the invention could be an implementation as part of a Hypervisor, which is a scheme allowing multiple operating systems to run, unmodified, on a computer system at the same time. Also performance counters can be provided by other facilities such as Hypervisors or workload managers.

Additional Embodiment Details

The described techniques may be implemented as a method, apparatus or article of manufacture involving software, firmware, micro-code, hardware and/or any combination thereof. The term "article of manufacture" as used herein refers to code or logic implemented in a medium, where such medium may comprise hardware logic [e.g., an integrated circuit chip, Programmable Gate Array (PGA), Application Specific Integrated Circuit (ASIC), etc.] or a computer readable medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made without departing from the scope of embodiments, and that the article of manufacture may comprise any information bearing medium. For example, the article of manufacture comprises a storage medium having stored therein instructions that when executed by a machine results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAN), a read-only memory (ROM), a rigid magnetic disk and an optical disk. Current examples of optical disks include compact disk—read only memory (CD-ROM), compact disk—read/write (CD-R/W) and DVD.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Figure 9:
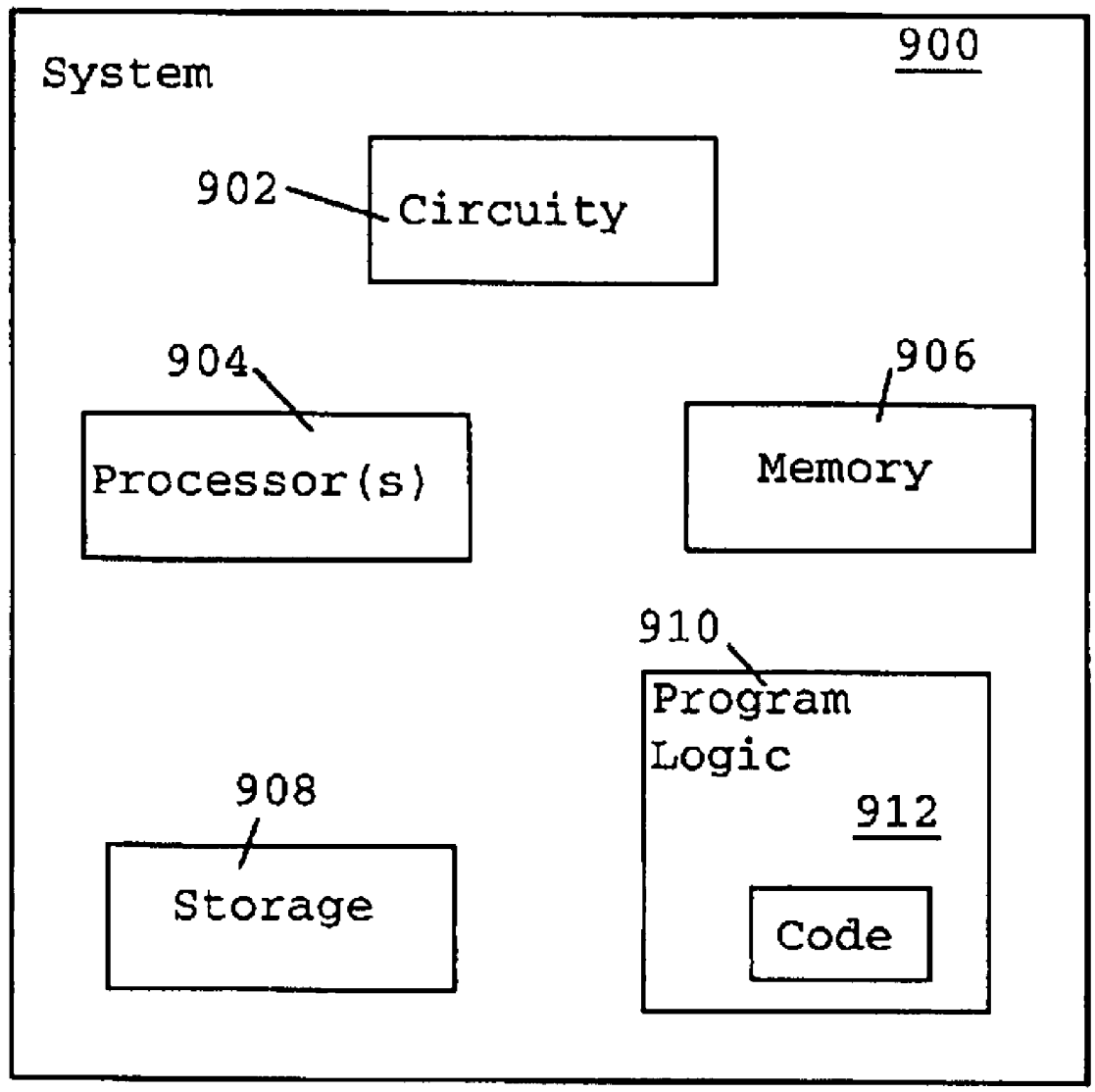
FIG. 9: Is a block diagram of a system in which certain embodiments may be implemented.

FIG. 9 illustrates a block diagram of a computer system 900 in which certain embodiments may be implemented. The system 900 may include a circuitry 902 that may in certain embodiments include a microprocessor 904. The computer system 900 may also include a memory 906 (e.g., a volatile memory device), and storage 908. The storage 908 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 908 may comprise an internal storage device, an attached storage device and/or a network accessible storage device. The system 900 may include a program logic 910 including code 912 that may be loaded into the memory 906 and executed by the microprocessor 904 or circuitry 902. In certain embodiments, the program logic 910 including code 912 may be stored in the storage 908. In certain other embodiments, the program logic 910 may be implemented in the circuitry 902. Therefore, while FIG. 9 shows the program logic 910 separately from the other elements, the program logic 910 may be implemented in the memory 906 and/or the circuitry 902.

Certain embodiments may be directed to a method for deploying computing instruction by a person or automated processing integrating computer-readable code into a computing system, wherein the code in combination with the computing system is enabled to perform the operations of the described embodiments.

At least certain of the operations illustrated in the figures may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in the figures and the description are described as having specific types of information. In alternative embodiments, the data structures and components may be structured differently and have fewer, more or different fields or different functions than those shown or referred to in the figures.

Therefore, the foregoing description of the embodiments has been presented for the purposes of illustration and description. It is not intended to be exhaustive or to limit the embodiments to the precise form disclosed. Many modifications and variations are possible in light of the above teaching.

The invention claimed is:

1. A method for dynamic voltage (v) and frequency (f) scaling of microprocessors within a computer system comprising the steps of:
   collecting and storing performance data of said computer system during a period of time;
   predicting future workload metrics and their duration for said computer system from the stored performance data, and classifying the current workload for said computer system at least in phases of normal and high workload based on the predicted future workload metrics and their predicted duration;
   modifying parameters of said computer system suitable to increase the frequency and voltage of said microprocessor for current workloads classified as a phase of high workload; and
   modifying frequency and voltage of said microprocessor to their normal values for current workloads classified as a phase of normal workload.

2. The method of claim 1, further comprising the step of:
   modifying parameters of said computer system suitable to reduce the frequency and voltage of said microprocessor below their normal values for current workloads classified as a phase of low workload.

3. The method of claim 2 further comprising the steps of:
   measuring and storing physical parameters of said computer system; and
   decreasing frequency and voltage of said microprocessor when the stored physical parameters exceed predefined limits in order to prevent malfunctions or hardware damage.

4. The method of claim 1, further comprising the steps of:
   measuring and storing physical parameters of said computer system; and
   decreasing frequency and voltage of said microprocessor when the stored physical parameters exceed predefined limits in order to prevent malfunctions or hardware damage.

5. The method of claim 1, wherein said performance data is provided by at least one of said microprocessor, a hypervisor executed on said computer system, or a workload manager for said computer system.

6. The method of claim 1, wherein the modification of parameters of said computer system is performed by mapping values using a table (LUT) representing performance states.

7. The method of claim 1 wherein the prediction of future workload metrics is performed using gradient-based calculations on stored performance data.

8. A computer readable storage medium storing a program of instructions loadable into the internal memory of a computer system to have the computer system undertake:
   collecting and storing performance data of said computer system during a period of time;
   predicting future workload metrics and their duration for said computer system from the stored performance data, and classifying the current workload for said computer system at least in phases of normal and high workload based on the predicted future workload metrics and their predicted duration;
   modifying parameters of said computer system suitable to increase the frequency and voltage of said microprocessor for current workloads classified as a phase of high workload; and
   modifying frequency and voltage of said microprocessor to their normal values for current workloads classified as a phase of normal workload.

9. The computer readable storage medium of claim 8 further providing the computer system to undertake:
   modifying parameters of said computer system suitable to reduce the frequency and voltage of said microprocessor below their normal values for current workloads classified as a phase of low workload.

10. A computer system having dynamic voltage (v) and frequency (f) scaling, comprising:
    means for collecting and storing performance data of said computer system during a period of time;
    means for predicting future workload metrics and their duration for said computer system from the stored performance data, and classifying the current workload for said computer system at least in phases of normal and high workload based on the predicted future workload metrics and their predicted duration;

means for modifying parameters of said computer system suitable to increase the frequency and voltage of said microprocessor for current workloads classified as a phase of high workload; and means for modifying frequency and voltage of said microprocessor to their normal values for current workloads classified as a phase of normal workload.

11. The computer system of claim 10, further comprising:

means for modifying parameters of said computer system suitable to reduce the frequency and voltage of said microprocessor below their normal values for current workloads classified as a phase of low workload.

12. The computer system of claim 11, further comprising:

means for measuring and storing physical parameters of said computer system; and means for decreasing frequency and voltage of said microprocessor when the stored physical parameters exceed predefined limits in order to prevent malfunctions or hardware damage.

13. The computer system of claim 10, further comprising:

means for measuring and storing physical parameters of said computer system; and means for decreasing frequency and voltage of said microprocessor when the stored physical parameters exceed predefined limits in order to prevent malfunctions or hardware damage.

* * * * *